Figure 1:
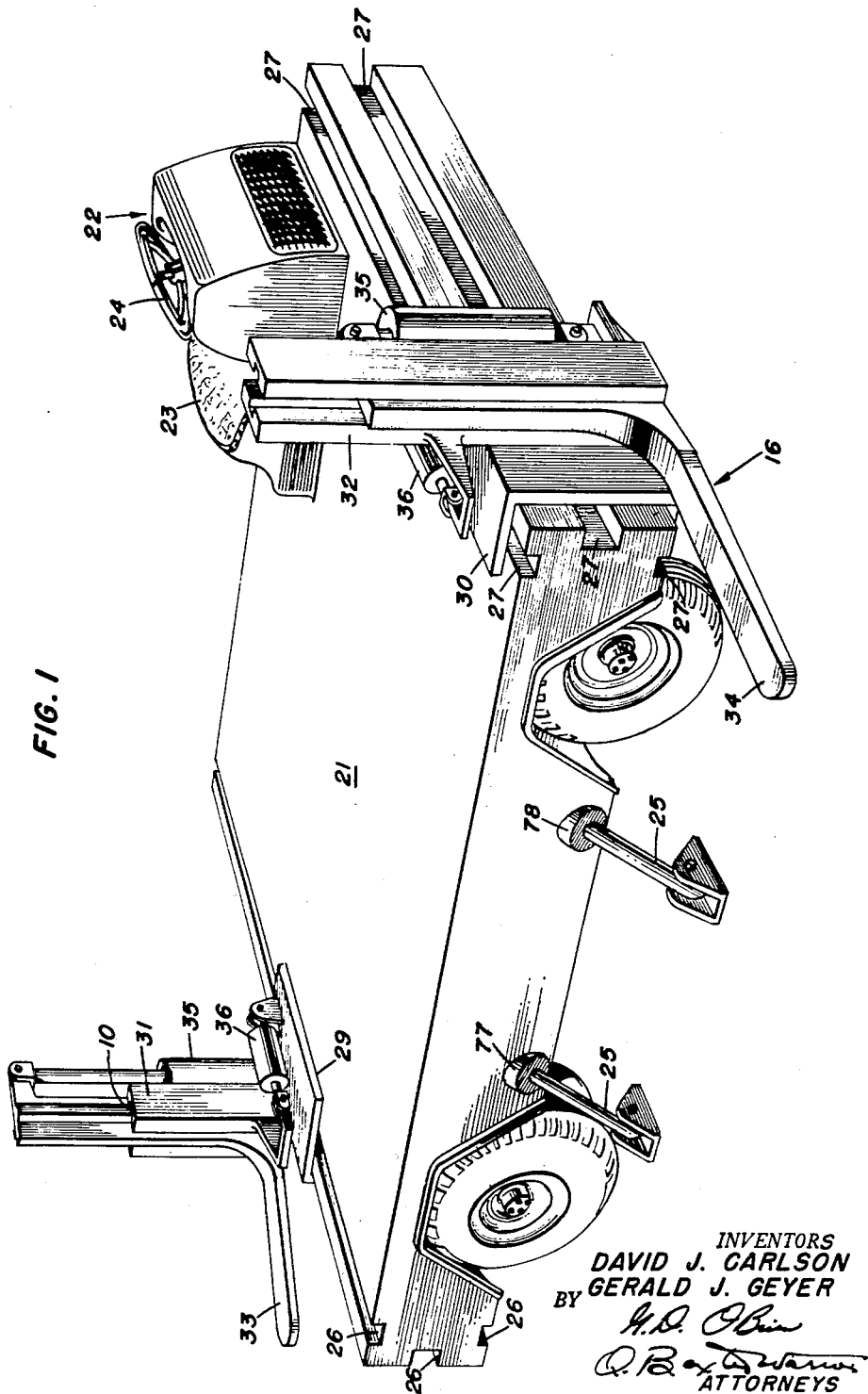

March 22, 1960

D. J. CARLSON ET AL 2,929,524

SELF-LOADING TRUCK

Filed July 14, 1953

6 Sheets-Sheet 1

INVENTORS
DAVID J. CARLSON
GERALD J. GEYER
BY
ATTORNEYS

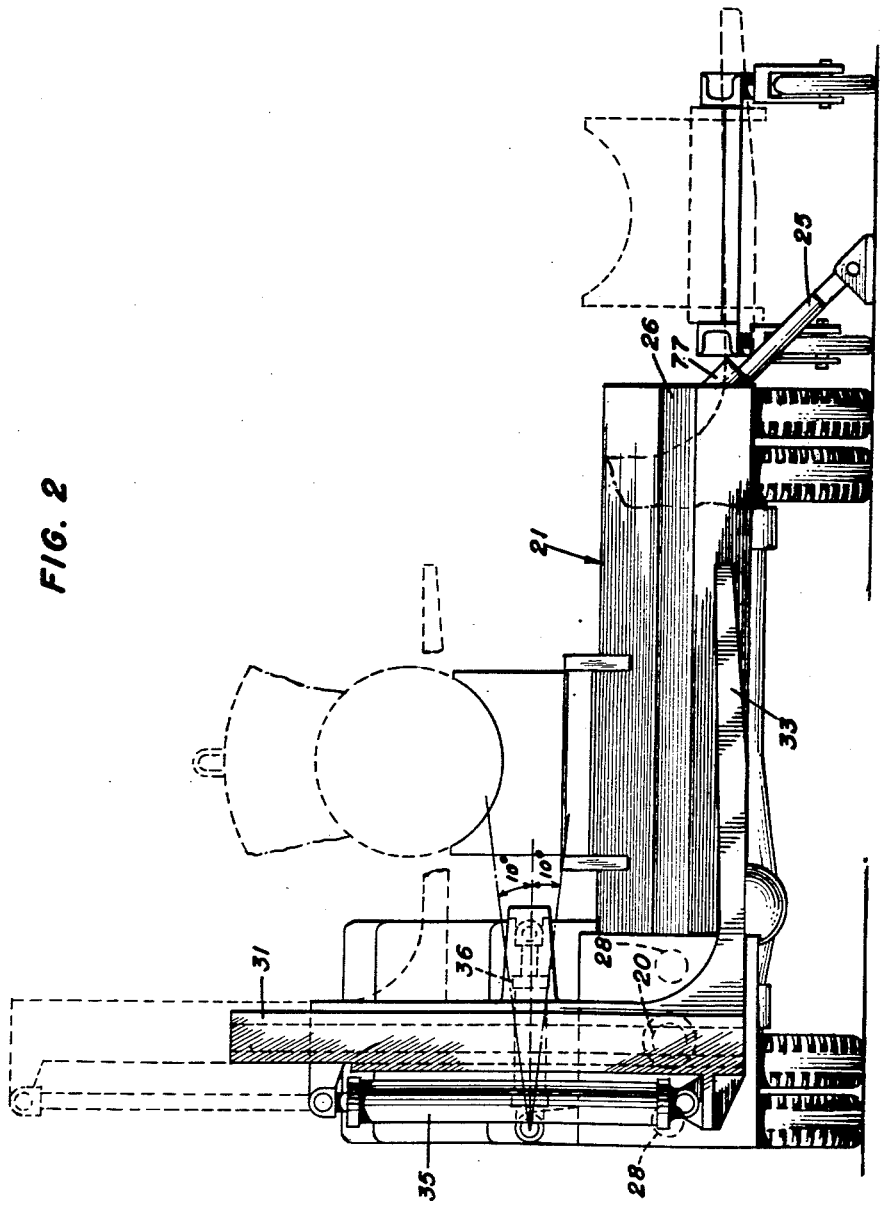

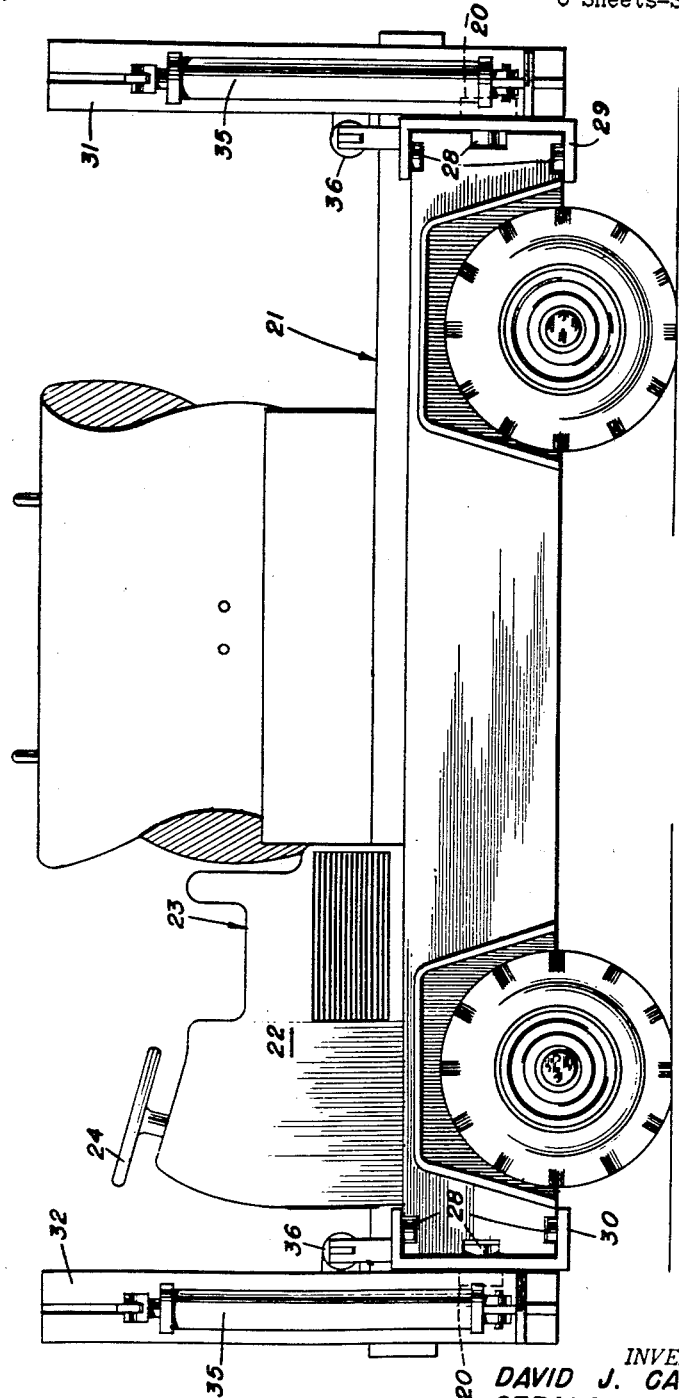

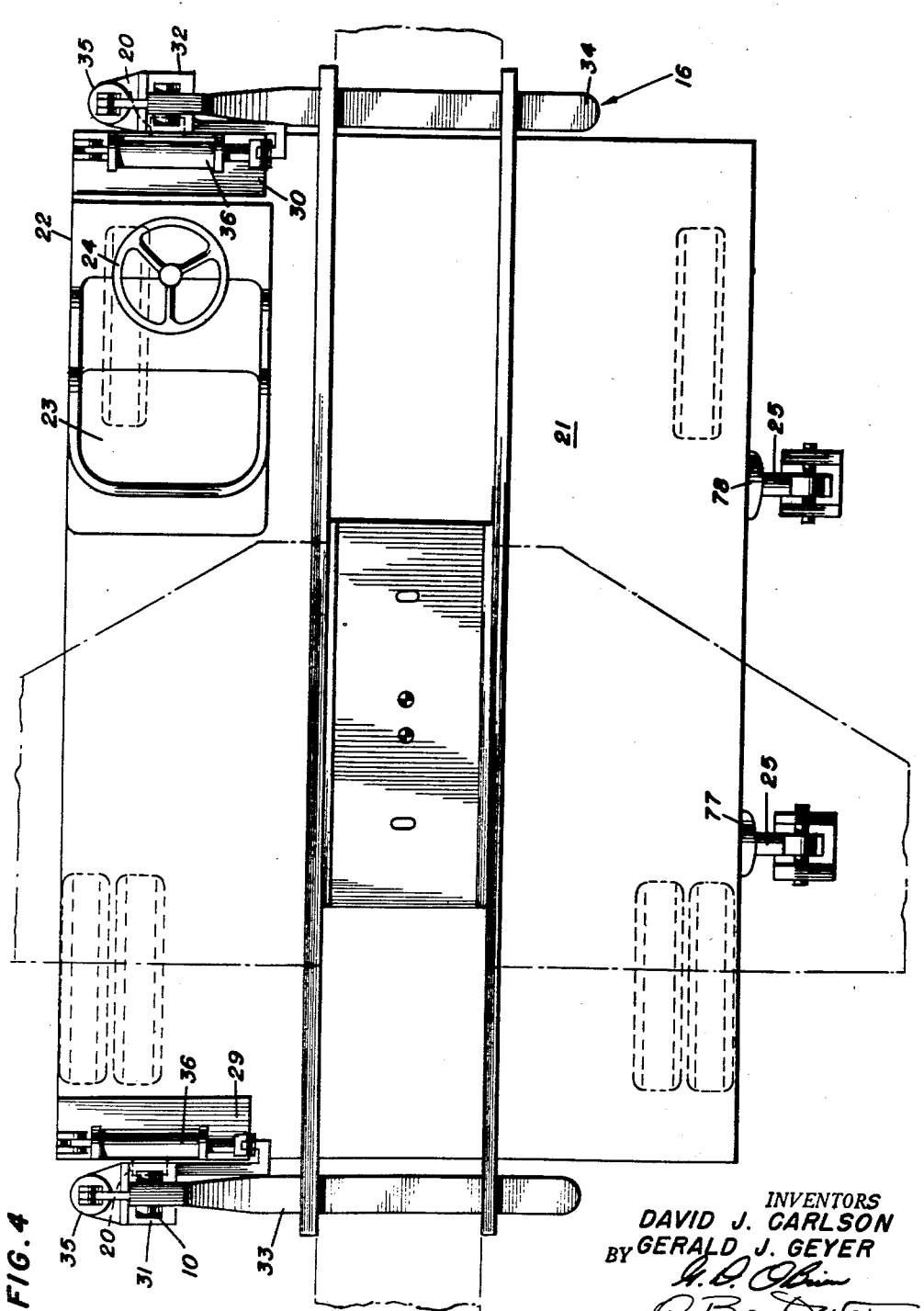

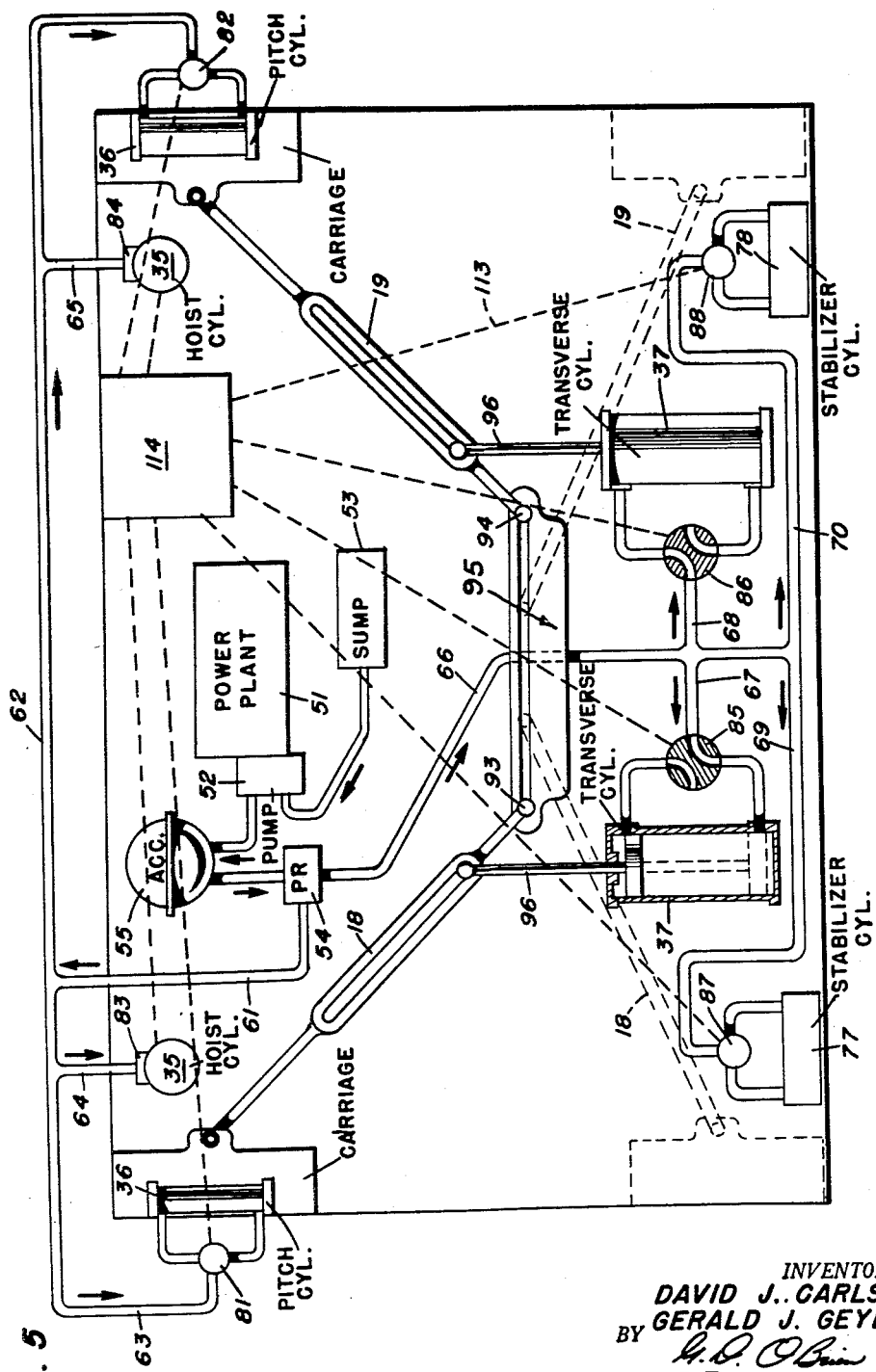

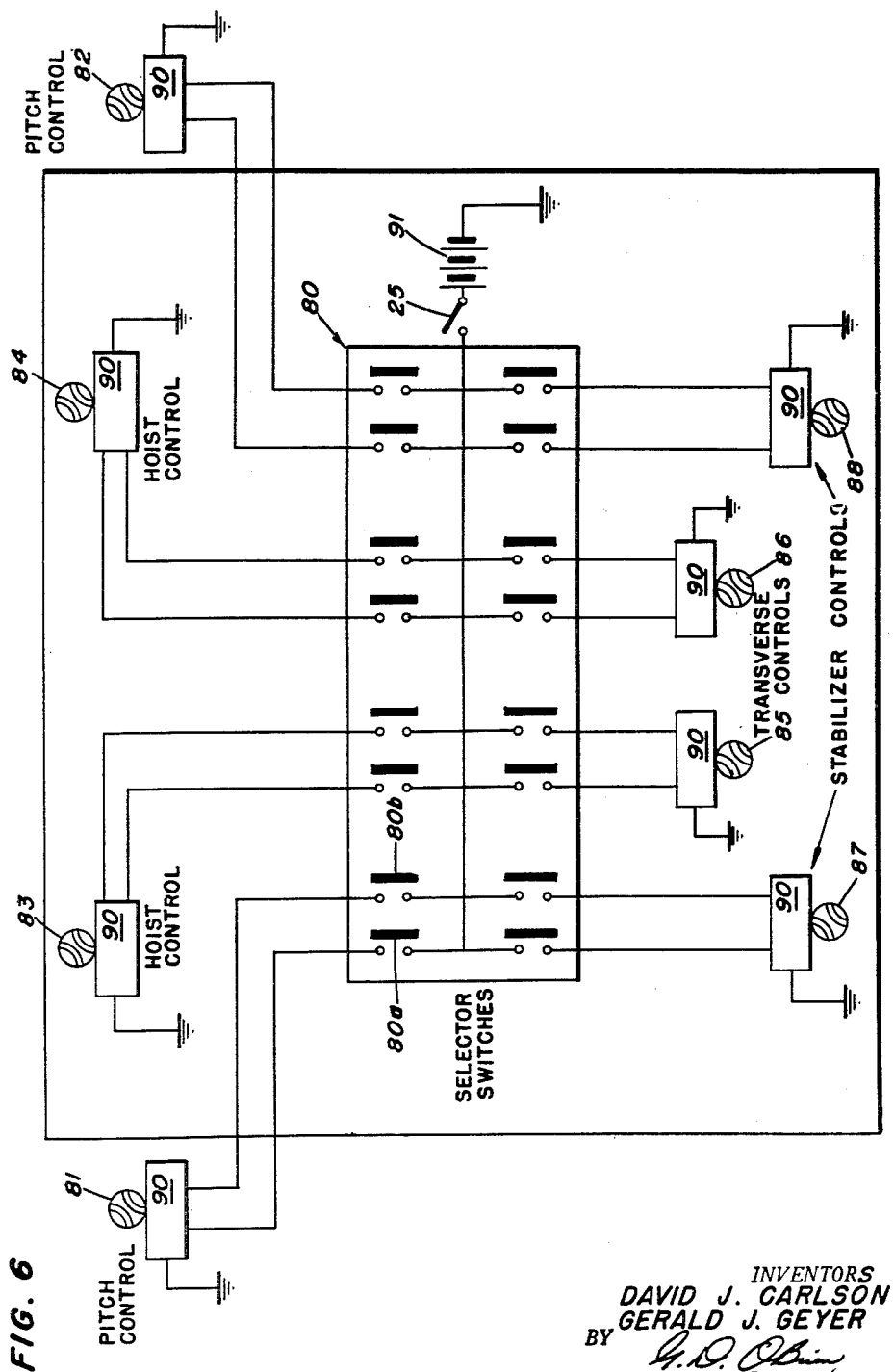

United States Patent Office 2,929,524
Patented Mar. 22, 1960

2,929,524

SELF-LOADING TRUCK

David J. Carlson, Vienna, Va., and Gerald J. Geyer, Hyattsville, Md.

Application July 14, 1953, Serial No. 368,020

10 Claims. (Cl. 214—674)

(Granted under Title 35, U.S. Code (1952), sec. 266)

The invention described herein may be manufactured and used by or for the Government of the United States of America for governmental purposes without the payment of any royalties thereon or therefor.

This invention relates to heavy duty trucks, and particularly to trucks having power operated loading forks mounted thereon and maneuverable conjointly or selectively to accomplish loading and unloading of cargo.

An object of the invention is to provide a fork-carrying truck of novel contour, with maximum adaptability to varying loading problems and situations.

Certain efforts have been made to equip heavy duty trucks with power loading mechanism by which cargo might be raised from a lower point alongside the bed of the truck, and then deposited on the truck bed. Many of these efforts have involved sacrifice of loading space, and some have involved sacrifice of structural stability and strength. Others have introduced complications that are highly expensive and render the truck difficult to operate and maintain.

The present invention provides a heavy duty truck that is structurally strong and stable, easy to operate and maintain, and efficient and economical as a cargo handling vehicle, both because of the availability of practically the entire surface area of the truck for cargo purposes, and because of the manner in which it lends itself to the pick-up or delivery of cargo from a location at one side of the truck. In this connection a second object of the invention is to provide a truck having extensive cargo receiving space in the form of an uninterrupted flat surface, running the entire length and width of the truck body.

A third object is to provide a heavy duty truck having a generally box-like body, including a flat upper surface and straight vertically disposed sides and ends, with means provided on the end surfaces of the body to serve as tracks or guideways for transverse travel of the loading forks to extended positions facilitating pick-up of the cargo, and for return transverse travel to facilitate depositing the cargo at the exact spot, on the truck surface, that is considered most appropriate.

A fourth object is to provide power means for causing and controlling the transverse travel of the loading forks, said power means being operable upon carriage mechanism movable along the end surfaces of the truck body; the loading forks being inegrated with the carriage mechanism.

A fifth object is to provide such loading carriages with fork-carrying, vertically disposed towers having rockable mounting on said carriages, whereby the forks may be tilted to a limited extent in a vertical plane, for greater efficiency in handling cargo during delivery to or from the truck surface.

A sixth object is to provide power means in association with such vertically disposed towers, for causing and controlling the lifting, lowering and tilting of said forks.

Other objects and many of the attendant advantages of this invention will be readily appreciated as the same becomes better understood by reference to the following detailed description when considered in connection with the accompanying drawings wherein:

Fig. 1 is a perspective view of a truck embodying the invention;

Figs. 2, 3 and 4 are, respectively, end, elevation and plan views of the truck shown in Fig. 1; and Figs. 5 and 6 are diagrams of hydraulic and electric circuits, respectively, for operation and control of the components illustrated in Figs. 1 through 4.

Referring first to Fig. 1, the truck therein illustrated has a generally box-like contour, with a flat upper surface 21 extending all the way from front to rear, and from side to side, except for one front corner that is occupied by the operator's compartment 22 equipped with a seat 23, steering wheel 24, and a control panel including ignition switch 15 and other switches (see Fig. 6) for control of the application of hydraulic power to the servo units to be described.

The front and rear walls of the truck, also the upper and lower truck surfaces adjacent said front and rear walls, are recessed to provide transverse channels or tracks 26 and 27, extending from corner to corner of the truck, to receive rollers 28 (Fig. 3) mounted on carriages, or dollies 29 and 30, movable along the front and rear tracks 26 and 27, respectively, by tractive effort applied thereto by way of slotted links 18 and 19 (Fig. 5) connecting said carriages with servo units to be described.

The lifting forks 33 and 34 are horizontally disposed extensions of towers 31 and 32, respectively, the former being mounted on carriage 29 and the latter on carriage 30. These towers may be raised by application of fluid pressure to pistons within the cylinder units 35 (Figs. 1 and 3) and are lowered by release of the fluid, as determined by the actuation of remotely controlled valve means to be described. Correspondingly, the pistons within the cylinder units 36 control tilting of the towers 31 and 32 about trunnion bearings 20 (Fig. 4) on the respective carriages, and the pistons within cylinder units 37 (Fig. 5) control the horizontal traverse of the carriage, and of the fork carrying towers mounted thereon; the carriages being movable in unison or differentially, as desired.

Fig. 2 shows in full lines the lowermost position of one fork, and in dash lines the position to which the fork may be raised. Dash lines in Fig. 2 also indicate the extent of tilting of cylinder 36, and the extent of horizontal traverse of one fork. Both forks, of course, have the same range of maneuverability. All three motions (vertical, horizontal, and tilting) are successively imparted in each loading and unloading operation, if the element to be loaded or unloaded is a long, heavy, article whose length is such as to span the space between the forks.

The power plant 51 for the truck is located approximately as shown in Fig. 5, and it may be the source of energy for the hydraulic system as well. In Fig. 5 the hydraulic system is shown as including a pump 52 driven from power plant 51 and supplying oil from source 53 to the fluid receiving servo units above described, by way of pressure regulating valve assembly 54; there being also included an accumulator 55 for maintaining a pressure reserve. From the pressure regulator 54 fluid conduits 61 through 68 lead to the servo units constituted by the cylinder assemblies 35, 36 and 37 above described. Additional conduits 69 and 70 lead to the cylinder assemblies 77 and 78, respectively, controlling the retractible stabilizing braces 25.

It will be understood that the operator has (in his compartment 22) remote control selector switches as shown at 80 (Fig. 6) by which he may selectively operate directional valves 81 through 88, in any sequence or concurrently, and thereby direct pressure fluid from the corresponding lines of the 61 through 70 group, into the corresponding servo cylinders; a return flow from the valves back to the sump 53 being also provided, by way of return conduits not fully illustrated in Fig. 5, due to lack of adequate space on the diagram. Individual solenoids 90 (Fig. 6) perform the actual valve shifting when energized from source 91 under the control of the appropriate selector switches 80. Springs (not shown) return the individual valves to their initial positions when switches 80 are reopened.

When the forks are being applied to a load of elongated contour, they will of course be successively lowered, raised, shifted transversely, and tilted in unison. On the other hand, either fork may be lowered, raised, shifted, or tilted independently of the other, or to a greater or less degree than the other, in order to "skew" the load with respect to the longitudinal axis of the truck, or tilt it for forward or rearward inclination with respect to the surface of the truck, as may be desired.

As shown in Fig. 5, the inner pivot bearings 93 and 94 of the links 18 and 19, respectively, are slidable in the slotted portion of a yoke 95 secured to the truck chassis, and piston rods 96 slide correspondingly in the slots of links 18 and 19, as the latter are swung about their pivots 93 and 94 in response to fluid pressure application to the inner chambers of cylinders 37, to move the piston rods downwardly, as viewed in Fig. 5. In actual practice, of course, the cylinders and piston rods will be disposed horizontally, that is, parallel to the truck surface 21, and beneath said surface. On the other hand, equivalent carriage traversing means differing from the linkage 18 and 19 may be substituted; for example, a system of gears engageable with racks secured to the respective carriages.

Obviously many modifications and variations of the present invention are possible in the light of the above teachings. It is therefore to be understood that within the scope of the appended claims the invention may be practiced otherwise than as specifically described.

What is claimed is:

1. In a heavy duty truck, a box-like body having a flat upper surface extending from end to end, and side to side, of the truck, a vertical end wall at the forward and rearward end of the truck body and each end wall terminating at said upper surface, a track extending along each of said vertical end walls, a track upon each upper and lower surface adjacent said vertical end walls, a plurality of rollers within said tracks, a substantially U-shaped carriage at each end of said body and operatively and slidably connected by way of said rollers to said body, power means for moving said carriages along said tracks, a vertically disposed tower carried by each of said carriages, a fork extending outwardly from said tower, and means for raising and lowering said fork while said tower is in any selected position along said tracks.

2. In the apparatus defined in claim 1, remotely controlled means for tilting each of said towers about a horizontal axis individual thereto and parallel to the longitudinal axis of said tracks.

3. Apparatus as defined in claim 1, wherein said raising and lowering means includes a source of pressure fluid, a fluid motor mounted on each of said carriages, and means in each fluid motor for actuating said fork individual thereto in response to application of fluid pressure from said source.

4. In a cross-country heavy duty truck, a box-like body having a flat upper surface of uniform level from one end of the truck to the other end thereof, and side to side of the truck, vertical end walls terminating at said upper surface, a track extending along each of said vertical end walls, a carriage reciprocable along each track, power means for independently moving said carriages along said tracks, a vertically disposed tower carried by each of said carriages, a fork extending outwardly from each of said towers, means for selectively raising and lowering said forks, and means for selectively tilting said towers.

5. In a heavy duty truck, a box-like body having a flat upper surface extending from end to end, and side to side, of the truck, a vertical end wall at the forward and rearward ends of the truck body and each end wall terminating at said upper surface, a track extending along each of said vertical end walls, a track upon each upper and lower surface adjacent said vertical end walls, a plurality of rollers within said tracks, a substantially U-shaped carriage at each end of said body and operatively and slidably connected by way of said rollers to said body, a vertically disposed tower carried by each of said carriages, a fork extending outwardly from said tower, means for raising and lowering said forks while said tower is in any selected position along said tracks, and remotely controlled means for selectively moving each of said carriages along the tracks.

6. In a heavy duty truck, a box-like body having a flat upper surface extending from end to end, and side to side, of the truck, a vertical end wall at the forward and rearward ends of the truck body and each end wall terminating at said upper surface, a track extending along each of said vertical end walls, a track upon each upper and lower surface adjacent said vertical end walls, a plurality of rollers within said tracks, a substantially U-shaped carriage at each end of said body and operatively and slidably connected by way of said rollers to said body, a vertically disposed tower carried by each of said carriages, each of said towers being pivotally mounted for rotation in a vertical plane, a fork extending outwardly from said tower, means for raising and lowering said fork while said tower is in any selected position along said tracks, power means for moving each of said carriages, power means for raising said forks in a vertical path, power means for selectively tilting said forks in a vertical plane, power means for stabilizing the truck during loading operation, a source of fluid pressure, and remotely controlled means for selectively distributing fluid under pressure from said source to all of said power means.

7. A heavy duty cross-country fork lift truck comprising, a rectangular box-like body having a flat upper surface of uniform level over its entire upper surface and extending from one end of the truck to the other end thereof, vertical end walls terminating at said upper surface, guide means extending along each of said vertical end walls, a carrier slidably disposed within each of said guide means, a tower tiltably carried by each of said carriers power means for moving said carriers along said guide means and for tilting each of said towers relative to its respective carrier, a horizontally disposed lift arm elevatably carried by each of said towers, and means for selectively elevating, lowering, and tilting said lift arms.

8. In a cross-country heavy duty truck, a box-like body member, load engaging means at each end of said box-like body member, means for independently moving each load engaging means transversely across its respective end of the body member, means for independently raising and lowering each of said load engaging means while the latter is in any selected transverse position, and means for independently tilting each of said load engaging means while the latter is in any selected transverse position and any selected elevated position.

9. A vehicular loader for loading, transporting and unloading highway trailers, comprising in combination, a frame having ground wheels at front and rear ends, means forming a transverse guideway and load support at each end of the frame adjacent to but offset longitudinally with respect to said wheels, a loader tower supported in each said guideway for transverse and vertical movements, and load carrying forks operative in said towers for picking up a trailer from alongside the frame, lifting the trailer over the frame for transport and redepositing the trailer alongside the frame.

10. A vehicular loader comprising in combination, a frame, front and rear wheels mounted at front and rear end portions of the frame and supporting the same for travel movement, transversely extending guideways on the front and rear ends of the frame and respectively forwardly and rearwardly offset from the front and rear wheels, loader towers supported in the guideways at front and rear ends of the frame for transverse and vertical movements, load carrying elements operatively associated with said towers for manipulation thereby to raise a load from alongside the frame and deposit the load on the frame for transport, and the said guideways at one end of the frame at least being vertically spaced apart one above the other.

References Cited in the file of this patent

UNITED STATES PATENTS

| | | |
|---|---|---|
| 1,887,056 | Hunt | Nov. 8, 1932 |
| 2,008,324 | Grab | July 16, 1935 |
| 2,366,378 | Barrett | Jan. 2, 1945 |
| 2,405,893 | Leftwich | Aug. 13, 1946 |
| 2,437,806 | Dempster | Mar. 16, 1948 |
| 2,591,544 | Hegarty | Apr. 1, 1952 |
| 2,621,811 | Lull | Dec. 16, 1952 |
| 2,621,812 | Lull | Dec. 16, 1952 |
| 2,720,993 | Lull | Oct. 18, 1955 |
| 2,729,352 | Hodges et al. | Jan. 3, 1956 |